Nov. 17, 1936.     A. TURAK     2,061,052
DISPENSER
Filed Oct. 21, 1935
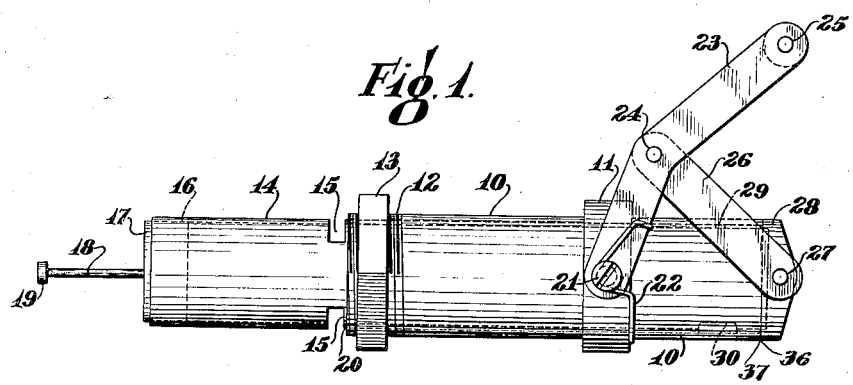
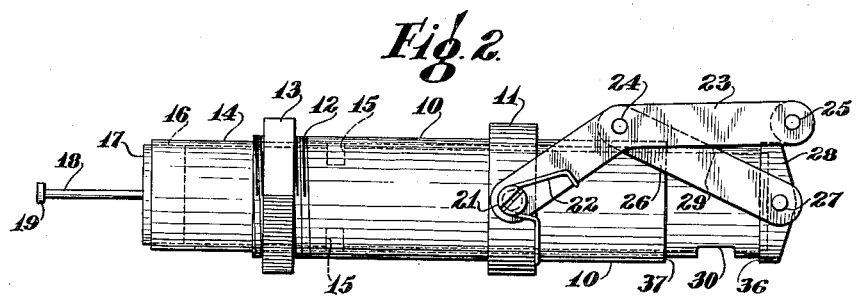
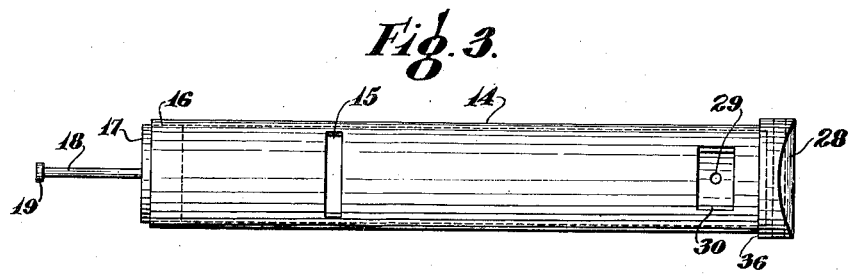
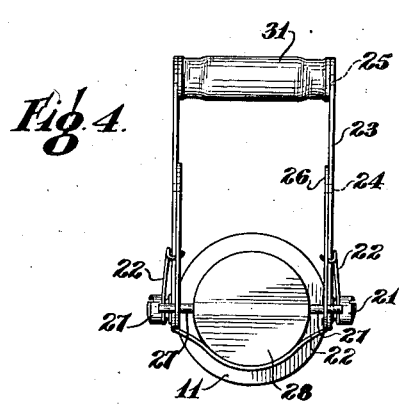
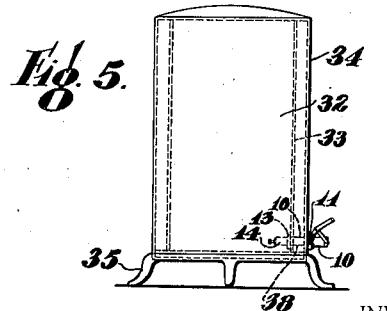
INVENTOR.
Anthony Turak.
BY George V. Woodling
ATTORNEY.

Patented Nov. 17, 1936

2,061,052

UNITED STATES PATENT OFFICE 2,061,052

DISPENSER

Anthony Turak, Cleveland, Ohio

Application October 21, 1935, Serial No. 45,857

16 Claims. (Cl. 221—105)

My invention relates in general, to dispensers, and more particularly to dispensers for dispensing fluids and other free flowing fungible material from containers in pre-determined quantities.

An object of my invention is to provide a device to dispense fluids and other free flowing fungible material through a hole in a container in predetermined quantities.

Another object of my invention is to provide a device which will transfer fluids and other free flowing fungible material through my device in a pre-determined quantity.

A still further object is to provide a dispensing device which will permit only the said pre-determined quantity to be dispensed through a hole in a container without other fluid or free flowing fungible material escaping from the container.

Another object is to provide valve means for withdrawing such fluid and free flowing fungible material from a container.

A still further object of my invention is to provide a dispensing device which, when in normal position, closes the hole of a container through which the contents of the container are withdrawn.

Another object is to provide a simple and sanitary means for withdrawing the contents of the container in pre-determined quantities.

Another object is to provide a dispensing device which is easily attached to and detached from a container.

A still further object is to provide a dispensing device having a simple reciprocating movement for dispensing the contents of a container in predetermined quantities.

Other objects and a fuller understanding may be had by referring to the following description and claims taken in conjunction with the accompanying drawing, in which:

Figure 1 illustrates a side view of my device unattached to a container and showing the device in closed position;

Figure 2 represents a side view of my device unattached to a container and shown in an opened position;

Figure 3 represents a view looking up at the bottom of the sliding receptacle 14;

Figure 4 represents a right-hand end view of the device illustrated in Figure 1; and Figure 5 illustrates my device mounted in the hole of a container and showing a typical use of the device in actual practise.

The container 32 is shown as having a hole 38 through its walls, the inner wall 33 and the outer wall 34, in a position near the bottom of the container 32, so that fluids and other free flowing fungible material stored in the container naturally tend to flow out through the hole 38. The container 32 is shown in Figure 5 as set up upon legs 35 for the convenient withdrawal of the contents of the container through the use of my device.

I particularly show the details of my device in Figure 1 wherein the device is shown separate and unmounted. The sleeve member 10 is cylindrical in shape and is of the proper size to snugly fit into the hole 38 of the container 32, so that the contents of the container 32 cannot leak out between the sleeve member 10 and the walls of the container 32. The sleeve member 10 has a collar portion 11 which has a larger diameter than the main portion of the sleeve member 10. The collar portion 11 is adapted to be tightly pressed against the outer wall 34 of the container 32 and to make a tight connection therewith. On the other end of the sleeve member 10, and made a part thereof, are the threads 12.

In mounting the member 10 in the hole 38 of the container 32, the end of the member 10, having the threads 12, is first inserted into the hole 38 from outside of the container 32 and pushed inwardly until the collar 11 tightly engages the outside wall 34. When in that position, the nut 13 is screwed on to the threads 12 of the member 10 from the inside of the container 32. The nut 13 is tightened down so that the member 10 is firmly engaged in the hole 38 by reason of the grip between the collar 11 and the nut 13. Inserted into the inner hole 20 of the sleeve member 10 is the cylindrical receptacle 14. The cylindrical receptacle 14 has two openings 15 cut in the side thereof near one end of the receptacle 14. In placing the receptacle 14 within the member 10, the end of the receptacle 14, having the openings 15, is first inserted into the inner hole 20 of the member 10 from the end of the member 10 outwardly of the container 32, or in other words, is inserted first into the end of the member 10 on which is mounted the yoke. The receptacle 14 slides within, and longitudinally of, the hole 20 of the member 10. The receptacle 14 is restrained from sliding all of the way through the hole 20 of the member 10 by reason of the enlarged end 28 of the receptacle 14. The receptacle 14 will slide inwardly in respect to the member 10 until the edge 36 of the enlarged end 38 engages the edge 37 of the sleeve member 10. The edges 36 and 37 are adapted to fit tightly together and therefore make a tight connection between the sleeve member 10 and the enlarged end 28. These edges 36 and 37 therefore operate as a valve to tightly close the hole 20 of the sleeve member 10 when the receptacle 14 is pushed inwardly.

In speaking of inward and outward motion of the receptacle 14, it is to be understood that inward motion means motion toward the interior of the container 32, which in Figures 1 and 2 would be a motion to the left. By outward motion, I mean a movement toward the right in the illustration shown in Figures 1 and 2.

In the side of the receptacle 14 at a point near the enlarged end 28 is the opening 30. This opening 30 is located in the bottom portion of the receptacle 14 so that fluids and other contents of the receptacle 14 will flow therefrom unless otherwise restrained. Approximately at a point above the opening 30, is a small hole 29 of the receptacle 14. The small hole 29 is for the purpose of admitting air into the receptacle 14 when the opening 30 is in an unrestrained or open position. By the admission of air through the small hole 29, a vacuum in the receptacle 14 is avoided and the contents flow more freely therefrom. The openings 15 at the other end of the receptacle 14 may be in any position, but I prefer to cut them in the side of the receptacle 14, one in a lower portion of the receptacle and one in the upper portion of the receptacle so that the contents of the container may freely flow through these openings 15 into the receptacle 14, unless the openings are otherwise blocked or cut off as will hereafter be explained.

In the inner hole 16 of the receptacle 14 at the end opposite from the enlarged end 28, is inserted a stopper 17. Any form of stopper may be used but I prefer to use a cork stopper as this fits tightly within the hole 16 of the receptacle 14, and yet may be moved to and fro within the hole 16. To facilitate the movement of the stopper 17, I provide a stem 18 mounted in the stopper 17 and a knob 19 attached to the end of the stem 18. By manually pushing upon the knob 19, the stopper 17 may be placed within the hole 16 of the receptacle 14 at any desired position. By changing the position of the stopper 17, the contents of the receptacle 14 are thereby determined. It is obvious that the stopper 17 cannot be pushed into the receptacle 14 beyond the point of the openings 15 as this will inconvenience the actual operation of my device. However, by placing the stopper 17 at various points within the hole 16 of the receptacle 14 between the inner end of the receptacle 14 and the openings 15, the contents of the receptacle 14 may be thereby determined. It is also to be seen that by the entire removal of the stopper 17, by pulling upon the stem 18, that the receptacle 14 may be more easily cleaned and is therefore, more sanitary.

In order to facilitate the inward and outward movement of the receptacle and the sleeve member 10, I provide certain operative means. Mounted upon the sides of the yoke 11, are two lever arms 23. These are pivotally mounted to the yoke 11 by means of the screw mountings 21. At the other end of the lever arm 23 is mounted a handle 31 by means of the pins 25. The handle 31 is mounted transversely of the two lever arms 23. The lever arm 23 has a slight bend about half way between the ends. Pivotally connected to the lever arm 23 at the bend of the lever arm 23 is a shorter lever arm 26. The two lever arms 23 and 26 are pivotally connected by means of the pin 24. The end of the shorter lever arm 26, opposite from the pin 24, is pivotally mounted to the enlarged end 28 of the receptacle 14 by means of the pin 27 which extends through a lateral hole in the enlarged end 28.

In order to keep the edge 36 of the enlarged end 28 tightly engaged against the edge 37 of the sleeve member 10, when not withdrawing the contents of the container 32, I provide a wire spring member 22. One end of the spring 22 is caught against the side of the lever arm 23 as illustrated, bent around the pivoted mounting 21 two times, and thence downwardly under the sleeve member 10 but outwardly of the yoke 11, and thence up around the sleeve member 10 on the other side where it is likewise bent around the mounting 21 and up under the lever arm 23 on the opposite side of my device. The action of the spring member 22 is therefore to keep a spring pressure upon the lever arm 23 to hold it in an upright position. When the lever arm 23 is constrained upwardly, the shorter lever arm 26 is forced inwardly and thereby pulls upon the pin 27 and the receptacle 14, thereby tending to keep the receptacle 14 in an inward position.

Figures 1 and 2, being side views, show only a half of my operative means, however, the arms 23, 26, and the spring member 22, and their respective mountings are duplicated upon the other side of my device. Figure 4, showing a right-hand end view of my device, illustrates the assembling of the operative means including the lever arms 23 and 26, the handle 31, and the spring member 22. It is to be seen from the view in Figure 4, that both sides of the device are identical and work together in common operation.

In order to illustrate the nature of the receptacle 14, I show it in Figure 3 separate from the sleeve member 10. The view shown is that of looking upwards at the bottom of the receptacle 14 so that the two openings 15 are shown in alignment. The bottom opening 30 is shown as leading into the interior of the receptacle 14 and through which the small air hole 29 is seen. The shape and nature of the enlarged end 28 is also revealed in that it is beveled laterally of my device. The beveling contour of the enlarged end 28 provides ample room for the pin 27 to go through the enlarged end 28 at its thickest portion.

The operation of my device is illustrated by Figures 1 and 2 in which Figure 1 shows my device in a closed or inward position and Figure 2 shows my device in an opened or outward position. When the member 14 is slid inwardly, of the sleeve member 10, so as to be in the closed position shown in Figure 1, the openings 15 are outside of the sleeve member 10 and are therefore unblocked. Being in communication with the interior of the container 32, the fluid or other free flowing fungible material flows through the openings 15 and fills up the receptacle 14. It is to be noted that when my device is in its closed position, that is, when the receptacle 14 is extended inwardly, that the opening 30 and the small air hole 29 are closed or blocked by reason of being tightly engaged with the inner wall of the sleeve member 10. Therefore, the contents, which have flowed into the receptacle 14 through the openings 15, cannot escape out through the opening 30. To prevent any possible chance of leakage between the walls of the receptacle and the sleeve member 10, the edge 36 of the enlarged end 28 tightly engages with the edge 37 of the sleeve member 10. This provides a good seal against any possible leakage, which might possibly seep through between the outer wall of the receptacle 14 and the inner wall of the sleeve member 10. It is, therefore, to be seen that the receptacle 14 is thereby filled to its predetermined capacity when my device is in its closed position.

When the operator desires to withdraw a quantity of fluid or other free flowing fungible material which may be stored in the container and which has flowed into the receptacle 14, as explained above, he seizes the handle 31 and presses downwardly upon the handle with sufficient force to overcome the restraining action of the spring member 22 and also with sufficient force to force the handle 31 downwardly. The action of the lever arm 23 moving downwardly pushes the shorter lever arm 26 outwardly, pushes the pin 27 outwardly, and thereby moves the receptacle 14 outward, that is, in an open position. This outward movement of the receptacle 14 causes the openings 15 to be closed as they are tightly engaged against the inner wall of the sleeve member 10. It is also to be seen that this outward motion so draws the receptacle 14 outward of the sleeve member 10 that the opening 30 and the small air hole 29 are uncovered and are no longer blocked by the inner wall of the sleeve member 10. The contents of the receptacle 14 thereupon flow out of the receptacle 14 through the opening 30 and is ready for use. The small air hole 29 aids in the flow of the contents through the opening 30 as it admits air into the receptacle 14 and prevents the creation of a vacuum therein. Although the contents of the receptacle 14 is thereby withdrawn, none of the contents of the container 32 is thereby allowed to escape. In this manner only the quantity allowed in the pre-determined capacity of the receptacle 14 is withdrawn each time that the receptacle 14 is moved outwardly by pushing down the handle 31.

In practise, I prefer to space the openings 15 and 30 so that there is one position when the openings 15 and the opening 30 are simultaneously closed. In this way, a retarded movement is effected so that the opening 30 cannot be opened until the openings 15 are entirely closed. In this way there can be no possible chance of the contents of the container 32 flowing directly through the openings 15, the receptacle 14, and out through the opening 30. Therefore, when the handle 31 is pushed downwardly and the receptacle 14 thereby moves outwardly, the openings 15 are first closed completely, and then thereafter the opening 30 is opened. It is, therefore, to be seen that the actual space between the openings 15 and the opening 30, depends upon the length of the sleeve member 10 and the position of the opening 30 in the receptacle 14.

My device provides an efficient and easy method of withdrawing the contents of the container 32 out through the opening 30 by the operation of the handle 31 of my device. After the contents of the receptacle 14 are withdrawn, the handle 31 is released and the spring 22 forces the handle 31 upwardly; and by a reverse process, the receptacle 14 is moved inwardly of the sleeve member 10; opening 30 and the small air hole 29 are closed, and the openings 15 are opened, and the device is ready for further dispensing as described above.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device adapted to dispense fluids from a container in pre-determined quantities, said container having a hole through which said fluid is withdrawn, comprising, in combination, a longitudinal member having an opening extending throughout its length and having opened ends, said longitudinal member being adapted to fit into and engage the said hole of the container, a receptacle of pre-determined capacity, said receptacle being adapted to fit into the hollow opening of said longitudinal member and to slidably engage with said longitudinal member, the said receptacle having a first portion adapted to be extended from said longitudinal member inwardly of said container, the said first portion having an opening adapted to permit the fluid in said container to flow into said receptacle when said first portion is inwardly extended from said longitudinal member, the said receptacle also having a second portion adapted to be extended from said longitudinal member outwardly from said container, the said second portion having an opening positioned adjacent to the outer end of said receptacle, said opening being adapted to permit the fluid in said receptacle to flow therefrom when said second portion is outwardly extended from said longitudinal member, means for adjustably determining the capacity of said receptacle, said means being mounted in the inner end of said receptacle, and means for sliding said receptacle in said member in a reciprocating manner so as to be alternately extended inwardly and outwardly from said member, thereby dispensing the fluid in said container in quantities measured by the capacity of said receptacle.

2. A device adapted to dispense free flowing fungible material from a container in pre-determined quantities, said container having a hole through which said material is withdrawn, comprising, in combination, a hollow cylindrical member, said member being adapted to engage in the hole of said container, a hollow cylindrical receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the said container, and having an opening positioned adjacent to the outer end of said receptacle, said opening being adapted to permit the material in said receptacle to flow therefrom when said receptacle is extended from the end of said member outwardly of the said container, valve means for preventing leakage through said member when said receptacle is extended inwardly from said member, means for adjustably determining the capacity of said receptacle, said means being mounted in the inner end of said receptacle, and means for moving said receptacle relative to said member so as to be alternately extended inwardly and outwardly of said container so as to fill the said receptacle with said material when extended inwardly and to discharge said material from said receptacle when extended outwardly.

3. In combination with a container adapted to store fluid, the said container having a hole through which said fluid is discharged, a device for dispensing said fluid through said hole in pre-determined quantities, comprising, in combination, a sleeve member adapted to fit into said hole in the container, fastening means for engaging said sleeve member in said hole, a receptacle adapted to be inserted into, and to move longitudinally of, said sleeve member, said receptacle having an opening adapted to permit the fluid in said container to flow into said receptacle when said receptacle is moved in said sleeve member inwardly of said container, and having an opening positioned adjacent to the outer end of said receptacle, said opening being adapted to permit the fluid in said receptacle to flow therefrom externally of said container when said receptacle is moved in said sleeve member outwardly of said container, means for preventing said fluid from escaping through said sleeve externally of said receptacle, means for adjustably determining the capacity of said receptacle, said means being mounted in the inner end of said receptacle, and lever means for moving said receptacle longitudinally of said member in a reciprocating manner.

4. A device for dispensing fluids in pre-determined quantities from a container having a hole through which said fluid is withdrawn, comprising, in combination, a sleeve member, said sleeve member being adapted to engage said hole, a receptacle, said receptacle being adapted to snugly fit within, and to slidably move longitudinally of, said sleeve member, means for adjustably determining the capacity of said receptacle, said means being mounted in the inner end of said receptacle, means for connecting said receptacle in communication with said container so that the fluid in said container flows into said receptacle when said receptacle is moved inwardly of said container, and means positioned adjacent to the outer end of said receptacle, said means being adapted for discharging said fluid in the receptacle externally of said container when said receptacle is moved outwardly of said container.

5. The combination, with a liquid dispensing container having a sleeve member inserted in the wall thereof, of a receptacle having an adjustable capactiy, said reecptacle being adapted to fit into, and to slide longitudinally of, said sleeve member, and having an opening adjacent to each end thereof, the said openings being positioned in the receptacle so that when the receptacle is moved inwardly the inner opening is in communication with the container and the outer opening is closed and so that when the receptacle is moved outwardly, the outer opening is open and the inner opening is closed, means for adjusting the capacity of said receptacle, said means being mounted in the inner end of said receptacle, and a valve member mounted in the outer end of said receptacle externally of the sleeve member, said valve member having a square shoulder for engaging the outer end of said sleeve member to form a flat sealing surface at right angles to the receptacle thus providing a tight seal between the receptacle and the sleeve member when the receptacle is moved inwardly of the sleeve member.

6. The combination, with a liquid dispensing container having a sleeve member inserted in the wall thereof, of a receptacle adapted to fit into, and to slide longitudinally of, said sleeve member, and having an opening adjacent to each end thereof, the said openings being positioned in the receptacle so that when the receptacle is moved inwardly the inner opening is in communication with the container and the outer opening is closed and so that when the receptacle is moved outwardly the outer opening is open and the inner opening is closed, and a valve member mounted on the outer end of said receptacle externally of the sleeve member, said valve member having a square shoulder for engaging the outer end of said sleeve member to form a flat sealing surface at right angles to the receptacle thus providing a tight seal between the receptacle and the sleeve member when the receptacle is moved inwardly of the sleeve member.

7. A device adapted to dispense free flowing fungible material from a container in pre-determined quantities, said container having a hole through which said material is withdrawn, comprising, in combination, a hollow sleeve member, said member being adapted to engage in the hole of said container, a hollow receptacle adapted to fit into, and to slide longitudinally of, said member so as to alternately extend from each end of said member, the said receptacle having an opening adapted to permit the material in said container to flow into said receptacle when the receptacle is extended from the end of the member inwardly of the container, and having an opening adapted to permit the fluid in said receptacle to flow therefrom when said receptacle is extended from the end of said member outwardly of said container, valve means for preventing leakage through said member when said receptacle is extended inwardly from said member, means for preventing the rotation of the receptacle within the sleeve member so that the engaging wall of the receptacle and the sleeve member are not worn by rotational movement, and means for moving said receptacle relative to said member so as to be alternately extended inwardly and outwardly of said container so as to fill the said receptacle with said material when extended inwardly and to discharge said material from said receptacle when extended outwardly, said means including a first lever having one end pivotally and detachably connected to said sleeve member, and a second lever having one end pivotally connected to the outer end of said receptacle and having its other end pivotally connected to said first lever intermediate the ends of said first lever so that the pivotal movement of said first lever causes said second lever to actuate said receptacle relative to the said sleeve member.

8. A device adapted to dispense free flowing fungible material from a container in pre-determined quantities, said container having a hole through which said material is withdrawn, comprising, in combination, a hollow sleeve member, said member being adapted to engage in the hole of said container a hollow receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the container, and having an opening adapted to permit the material in the receptacle to flow therefrom when said receptacle is extended from the end of said member outwardly of said container, valve means for preventing leakage through said member when said receptacle is extended inwardly from said member, means for moving said receptacle relative to said member so as to be alternately extended inwardly and outwardly of said container so as to fill the said receptacle with said material when extended inwardly and to discharge said material from said receptacle when extended outwardly, said means for moving the receptacle being further adapted for preventing the rotation of the valve means so that said valve means operate in the same manner during each reciprocating movement, said means including a first lever having one end pivotally and detachably connected to said sleeve member, and a second lever having one end pivotally connected to the outer end of said receptacle and having its other end pivotally connected to said first lever intermediate the ends of said first lever so that the pivotal movement of said first lever causes said second lever to actuate said receptacle relative to the said sleeve member, and resilient means carried by said sleeve member for restraining said first lever into position for holding the said receptacle inwardly of said sleeve member.

9. A device adapted to dispense free flowing fungible material from a container in pre-determined quantities, said container having a hole through which said material is withdrawn, comprising, in combination, a hollow sleeve member, said member being adapted to engage in the hole of said container, a hollow receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the container, and having an opening adapted to permit the material in the receptacle to flow therefrom when said receptacle is extended from the end of said member outwardly of the container, valve means for preventing leakage through said member when said receptacle is extended inwardly from said member, and means for moving said receptacle relative to said member so as to be alternately extended inwardly and outwardly of said container so as to fill the receptacle with the material when extended inwardly and to discharge said material from said receptacle when extended outwardly, said means for moving the receptacle including a first pair of levers having an end pivotally connected by detachable means to said sleeve member, one of said levers of said first pair of levers being connected on one side of said sleeve member and the other of said levers of said first pair of levers being connected on the other side of said sleeve member, a second pair of levers having one end of their ends pivotally connected to the outer end of said receptacle and having the other of their ends receptacle and having the other of their ends pivotally connected respectively to each lever of said first pair of levers intermediate the ends of each of the first pair of levers, and a handle mounted between the outer end of the first pair of levers, the arrangement of the levers being such that operation of the handle causes a movement of the first pair of levers in one direction to translate movement to the second pair of levers in another direction, thus moving the receptacle relative to said sleeve member.

10. A device adapted to dispense free flowing fungible material from a container in pre-determined quantities, said container having a hole through which said material is withdrawn, comprising, in combination, a hollow sleeve member, said member being adapted to engage in the hole of said container, a hollow receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the container, and having an opening adapted to permit the material in the receptacle to flow therefrom when said receptacle is extended from the end of said member outwardly of the container, valve means for preventing leakage through said member when said receptacle is extended inwardly from said member, and lever means for moving said receptacle relative to said member so as to be alternately extended inwardly and outwardly of said container so as to fill the receptacle with the material when extended inwardly and to discharge said material from said receptacle when extended outwardly, said lever means including a first pair of levers having an end pivotally connected by detachable means to said sleeve member, one of said levers of said first pair of levers being connected on one side of said sleeve member and the other of said levers of said first pair of levers being connected on the other side of said sleeve member, a second pair of levers having one of their ends pivotally connected to the outer end of said receptacle and having the other of their ends pivotally connected respectively to each lever of said first pair of levers intermediate the ends of each of the first pair of levers, and a handle mounted between the outer end of the first pair of levers, the arrangement of the levers being such that operation of the handle causes a movement of the first pair of levers in one direction to translate movement to the second pair of levers in another direction, thus moving the receptacle relative to said sleeve member, and a spring member carried by said sleeve member contacting each lever of said first pair of levers so as to restrain said levers into the position for holding the said receptacle inwardly of the said sleeve member.

11. A device adapted to dispense free flowing fungible material from a container in pre-determined quantities, said container having a hole through which said material is withdrawn, comprising, in combination, a hollow sleeve member, said member being adapted to engage in the hole of said container, a hollow receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the container, and having an opening adapted to permit the material in the receptacle to flow therefrom when said receptacle is extended from the end of said member outwardly of the container, valve means for preventing leakage through said member when said receptacle is extended inwardly from said member, means for moving said receptacle relative to said member so as to be alternately extended inwardly and outwardly of said container so as to fill the receptacle with the material when extended inwardly and to discharge said material from said receptacle when extended outwardly, said means including two pivoted levers, one of said levers being attached to the sleeve member, and the other of said levers being attached to the receptacle and also pivotally connected at an angle to, and intermediate the ends of, said one of said levers, the arrangement of the said levers being such that a movement of the pivoted portions of the levers in one direction causes a movement between the receptacle and the sleeve member in another direction, and a spring member carried by said sleeve member, said spring member having a portion engaged by said sleeve member against rotational movement and having another portion engaging one of said levers so as to restrain said lever into inward position.

12. A device adapted to dispense free flowing fungible material from a container in pre-determined quantities, said container having a hole through which said material is withdrawn, comprising, in combination, a hollow sleeve member, said member being adapted to engage in the hole of said container, a hollow receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the container, and having an opening adapted to permit the material in the receptacle to flow therefrom when said receptacle is extended from the end of said member outwardly of the container, valve means for preventing leakage through said member when said receptacle is extended inwardly from said member, means for moving said receptacle relative to said member so as to be alternately extended inwardly and outwardly of said container so as to fill the receptacle with the material when extended inwardly and to discharge said material from said receptacle when extended outwardly, said means including two pairs of pivoted levers, one of said pairs of levers being hingedly connected to said receptacle and the other of said pairs of levers being hingedly connected to said sleeve member, each of said one of said pair of levers being also pivotally connected at an angle to, and intermediate the ends of, one of said other of said pair of levers, the said pivoted levers being so mounted that a movement of the pivot of said levers laterally of the sleeve member causes the said levers to move relative to each other thus moving the relative positions of the receptacle and sleeve member, and a wire spring carried by the hinged connection on said sleeve member and engaging one of said pairs of levers for restraining said levers in an inward direction.

13. A device adapted to dispense free flowing fungible material from a container in pre-determined quantities, said container having a hole through which said material is withdrawn, comprising, in combination, a hollow sleeve member, said member being adapted to engage in the hole of said container, a hollow receptacle adapted to fit into, and to slide longitudinally of, said member so as to alternately extend from each end of said member, the said receptacle having an opening adapted to permit the material in said container to flow into said receptacle when said receptacle is extended from the end of the member inwardly of the container, and having an opening adapted to permit the material in the receptacle to flow therefrom when said receptacle is extended from the end of said member outwardly of the container, valve means for preventing leakage through said member when said receptacle is extended inwardly from said member, means for moving said receptacle relative to said member so as to be alternately extended inwardly and outwardly of said container so as to fill the receptacle with the material when extended inwardly and to discharge said material from said receptacle when extended outwardly, said means being mounted externally of said container and being further adapted for restraining said receptacle from outward longitudinal movement beyond its position of operation for discharge and a spring member carried by, and externally of, said sleeve member and adapted to exert a force on said means for holding said receptacle inward of said sleeve member and to yield to manual force applied to said means as said means are operated.

14. A device for dispensing fluent material in pre-determined quantities from a container having a hole through which said fluent material is withdrawn, comprising, in combination, a sleeve member, said sleeve member being adapted to communicate with said hole in the container, a receptacle, said receptacle being adapted to fit within and to slidably move longitudinally of, said sleeve member, means for adjustably determining the quantity dispensed by said receptacle, said means being adapted to cooperate with the rearward end of said receptacle, means for connecting said receptacle in communication with said container so that the fluent material in said container flows into the said receptacle when said receptacle is moved inwardly of said container, and means positioned near the forward end of the said receptacle, said means being adapted for discharging said fluent material in the receptacle externally of said container when said receptacle is moved outwardly of said container.

15. A device for dispensing fluent material in pre-determined quantities from a container having a hole through which said fluent material is withdrawn comprising, in combination, a sleeve member, said sleeve member being adapted to communicate with said hole, a receptacle, said receptacle being adapted to fit within, and to slidably move longitudinally of, said sleeve member, means for connecting said receptacle in communication with said container so that the fluent material in said container flows into said receptacle when the receptacle is moved in one direction, means for discharging said fluent material in the receptacle externally of said container when said receptacle is moved in another direction, and means for adjustably determining the amount of fluent material discharged in each operation of said receptacle, said means being carried rearwardly by said sleeve member.

16. In combination with a container adapted to store fluent material, the said container having a hole through which said fluent material is discharged, a device for dispensing said fluent material in pre-determined quantities, comprising, in combination, a member adapted to be inserted into, and to move longitudinally of, said sleeve member, the said piston member having an opening extending therethrough, means for connecting said opening in communication with said container so that the fluent material in said container flows into said opening when the piston member is moved in one direction in said sleeve member, means for discharging said fluent material from said opening externally of said container when the piston member is moved in another direction in said sleeve, and means carried by said sleeve member internally of said container for adjustably determining the capacity of the discharge through said opening in each operation of said piston member.

ANTHONY TURAK.